United States Patent [19]

Komurasaki et al.

[11] Patent Number: 5,218,870

[45] Date of Patent: Jun. 15, 1993

[54] VIBRATION SENSOR INCLUDING A REDUCED CAPACITY LOWER PORTION FOR MAINTAINING AIRTIGHTNESS AND ENHANCING RELIABILITY

[75] Inventors: Satoshi Komurasaki; Fumito Uemura, both of Himeji, Japan

[73] Assignee: Mitsubishi Denk K.K., Tokyo, Japan

[21] Appl. No.: 690,249

[22] Filed: Apr. 24, 1991

[30] Foreign Application Priority Data

Apr. 27, 1990 [JP] Japan ............................... 2-45240[U]
May 16, 1990 [JP] Japan ................................. 2-124221

[51] Int. Cl.⁵ ........................................... G01H 11/08
[52] U.S. Cl. ........................................ 73/654; 73/35; 310/329
[58] Field of Search .................... 73/35, 654; 310/329

[56] References Cited

U.S. PATENT DOCUMENTS

| | | | |
|---|---|---|---|
| 4,129,042 | 12/1978 | Rosvold | 73/727 |
| 4,193,647 | 3/1980 | Guess et al. | 310/324 |
| 4,371,804 | 2/1983 | Peng et al. | 73/35 |
| 4,393,688 | 7/1983 | Johnston et al. | 73/35 |
| 4,483,180 | 11/1984 | Ohbuchi et al. | |
| 4,630,465 | 12/1986 | Hatton | 73/35 |
| 4,704,894 | 11/1987 | Inuzuka et al. | 310/329 |
| 4,723,087 | 2/1988 | Fox et al. | 310/329 |
| 4,727,279 | 2/1988 | Peng | 310/329 |
| 5,053,671 | 10/1991 | Kobayashi et al. | 310/329 |
| 5,118,981 | 6/1992 | Kobayashi et al. | 310/329 |

FOREIGN PATENT DOCUMENTS

| | | |
|---|---|---|
| 3041540 | 1/1983 | Fed. Rep. of Germany . |
| 3228534 | 4/1983 | Fed. Rep. of Germany . |
| 3643956 | 10/1987 | Fed. Rep. of Germany . |
| 8706781 | 9/1988 | Fed. Rep. of Germany . |
| 3930314 | 3/1990 | Fed. Rep. of Germany . |
| 93215 | 6/1982 | Japan . |

Primary Examiner—Hezron E. Williams
Assistant Examiner—Rose M. Finley
Attorney, Agent, or Firm—Sughrue, Mion, Zinn, Macpeak & Seas

[57] ABSTRACT

A vibration sensor is provided in which the depth of a caulked portion of the sensor's case is increased so as to increase the capacity of a recess defined between this caulked portion and the cover. The volume of a potting agent filling the recess can thereby be increased to improve the airtightness of the caulked portion and the reliability of the vibration detector. A vibration plate having cutouts circumferentially spaced along an outer, peripheral portion may be used in the vibration detector if the volume of the space formed on a lower side of the vibration plate is limited to about a few to ten percent of that of the space formed on the opposite, terminal side. The expansion of air in the spaces caused by a thermal shock is therefore substantially equal to the expansion of air contained in the space on the terminal side alone, so that vibration sensor can maintain sufficient airtightness and can be improved in reliability.

1 Claim, 2 Drawing Sheets

VIBRATION SENSOR INCLUDING A REDUCED CAPACITY LOWER PORTION FOR MAINTAINING AIRTIGHTNESS AND ENHANCING RELIABILITY

BACKGROUND OF THE INVENTION

1. Field of the Invention

This invention relates to a vibration sensor for sensing vibrations of, for example, an internal combustion engine to detect knocking and, more particularly, to a case for accommodating such a vibration sensor.

2. Description of the Related Art

FIG. 3 shows a partially sectional side view of a vibration sensor of this kind. As illustrated in FIG. 3, a base case 1 which is one of two outer members of the vibration detector and which is formed of steel has a threaded portion 1a and a bottom surface 1c for attachment to an internal combustion engine (not shown). A vibration member 2 is formed of a metallic plate and has a vibration surface 2a as well as a fixing peripheral portion 2b. A disk-like piezoelectric element 3 for converting vibration into an electrical signal is bonded to a side of the metallic plate opposite to the vibration surface 2a and is positioned coaxially with threaded portion 1a. A resin cover 5 forms the second outer member and is thermo-formed with an intermediate portion of a steel terminal 6 embedded therein. The resin cover 5 has a fixing peripheral portion 5a. The terminal 6 is insulated from a reference electrode by the resin cover 5. The terminal 6 is connected to an upper electrode of the piezoelectric element 3 by a lead wire 4. The vibration plate 2, a disk spring 7 and the cover 5 are successively inserted in the base case 1 and are fixed by a caulked portion 1b. A fixed end of the vibrating portion of the vibration plate 2 is thereby created. Spaces 11a and 11b are formed in the base case 1 and the resin cover 5, respectively. A potting recess 12 is defined by the caulked portion 1b and the resin cover 5.

The conventional vibration sensor thus constructed is fixed on an internal combustion engine by means of the thread 1a of the case 1, with the seat surface 1c abutting on the engine. Vibration generated according to the operating condition of the internal combustion engine propagates to the vibration detector through the bottom surface 1c. The vibration of the case 1 is then propagated to the vibration plate 2 and to the piezoelectric element 3. The piezoelectric element 3 receives a stress due to the vibration, generates a detection signal proportional to the stress, and outputs a terminal 6 detection signal with respect to the electrode (not shown) on the vibration plate bonding side. Since the case 1 is a metallic member, it has the same potential as the vibration plate 2. The vibration sensor has a natural frequency such that the output is maximized when it resonates with a component of knocking vibration of the internal combustion engine. This natural frequency is determined by the properties of the vibration plates 2 as well as the piezoelectric elements and the stability condition of the caulked portion 1b.

The space 11a provided on the base 1 side of the vibration plate 2 and space 11b provided on the resin cover 5 side are closed by the base case 1 and the resin cover 5, respectively, which together form a complete outer casing of the vibration sensor. Airtightness of the connection (at the caulked portion 1b) between the base case 1 and the resin cover 5 with respect to the thermal expansions of air in the spaces 11a and 11b is important in terms of reliability.

To ensure desired airtightness, a bonding agent or a potting agent is applied to this connection so as to fill the recess 12 formed by the caulked portion 1b of the base case 1 and the peripheral portion 5a of the resin case 5. However, the caulked portion 1b has an L-like caulked shape as illustrated, and the capacity of the recess 12 is small as determined by a depth H1. The reliability of this airtight connection is proportional to the capacity of the potting agent having a sealing effect. It is therefore desirable to further increase the capacity of the recess 12.

Thus, in the conventional vibration sensor constructed as described above, the capacity of the recess 12 is small and the airtight performance is limited according to this capacity. It is necessary to increase the capacity and to improve the reliability.

For example, a vibration detector attached to a motor vehicle typically undergoes a change of about 0.3 atm in the pressure of the closed spaces, such changes in pressure severely affecting the detector's durability.

A vibration plate, such as the plate 2A shown in FIG. 4, may be used for the vibration sensor of FIG. 3. This vibration plate 2A has a plurality of cutouts 2c circumferentially spaced around an outer periphery of the disk in order to improve its characteristics with respect to temperature fluctuations. The outer circumferential ends of the cutouts 2c extend to the peripheral portion 5a of the cover 5 such that the spaces 11a and 11b on the opposite sides of the vibration plates 2A communicate with each other. The airtightness of the portion in which the steel terminal 6 is embedded is reduced by the thermal expansion of air in the spaces 11a and 11b. There is therefore the problem of a reduction in reliability of vibration detection.

SUMMARY OF THE INVENTION

In view of these problems, an object of the present invention is to provide a vibration sensor in which the capacity of the recess in the connection between the base case and the resin cover can be increased to improve the airtight performance and, hence, the reliability of the sensor.

Another object of the present invention is to provide a vibration sensor capable of maintaining the desired reliability even if a vibration plate having cutouts in its outer peripheral portion is used.

In order to achieve the above objects, according to one embodiment of the present invention, there is provided a vibration sensor including a piezoelectric element, a vibration plate joined to the piezoelectric element, a metallic case for holding the vibration plate so that a first space is formed on the side of the vibration plate remote from the surface to which the piezoelectric element is joined, and a resin cover with which the piezoelectric element is covered so that a second space is formed between the cover and the surface of the piezoelectric element, the resin cover and the case pinching and fixing the vibration plate the cover being fixed at a peripheral portion by caulking an edge portion of the case, the case edge portion being bent through an angle of at least 90°, the height of the caulked portion of the case edge portion being greater than the thickness of the cover at the peripheral end portion.

According to another aspect embodiment of the present invention, there is provided a vibration sensor including a piezoelectric element, a vibration plate joined to the piezoelectric element, the vibration plate having cutouts circumferentially spaced along a peripheral end portion, a metallic case for holding the vibration plate so that a first space is formed on the side of the vibration plate remote from the surface to which the piezoelectric element is joined, and a resin cover far covering the piezoelectric element so that a second space is formed between the cover and the upper surface of the piezoelectric element, the resin cover and the case pinching and fixing the vibration plate, and wherein the capacity of the first space is in a range from about a few to ten percent of the capacity of the second space.

DESCRIPTION OF THE PREFERRED EMBODIMENTS

Figure 1:
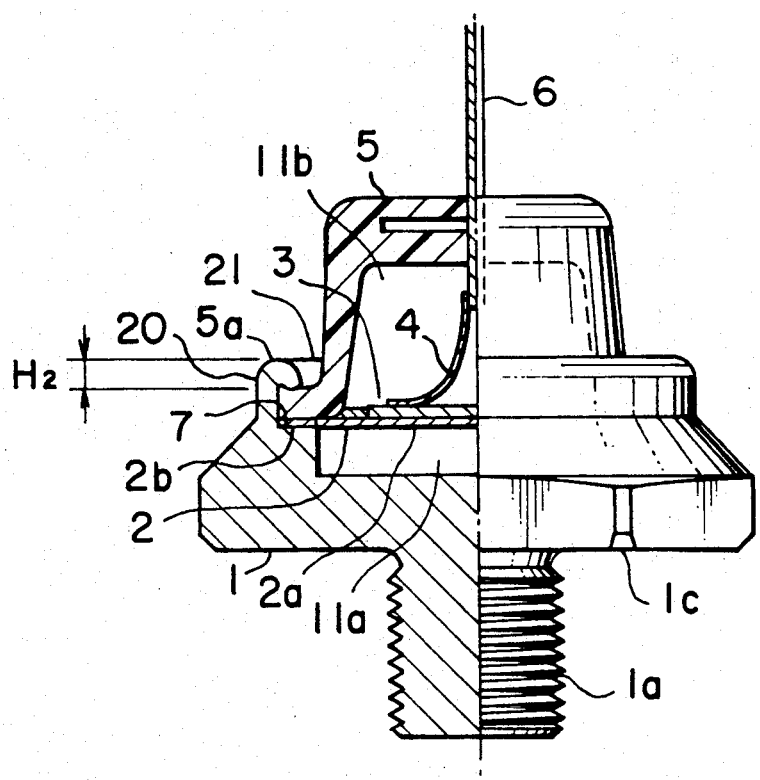
FIG.1 is a partially sectional view of a vibration sensor in accordance with a first embodiment of the present invention.

Two embodiments of the present invention will be described below. Components indicated by the same reference numerals in the drawings are identical and/or correspond.

In the first embodiment (FIG. 1), a base case 1 has a threaded portion 1a and a bottom surface 1c for fixing the vibration sensor. A vibration plate 2, a disk spring 7 and a resin cover 5 inserted in the base case are fixed by a caulked portion 20. A space 11a is surrounded by the vibration plate 2 and the base case 1, while a space 11b is surrounded by the vibration plate 2 and the a resin cover 5.

A recess 21 is defined by the caulked portion 20 and a fixing portion 5a of the cover 5 abutting on the caulked portion 20, and is filled with a potting agent or the like.

The capacity of the recess 21 defined by the caulked portion 20 and the peripheral portion 5a is determined depending upon the shape of the caulked portion 20.

The caulked portion 20 is bent at its end by an angle of 90° or greater so as to have a U-like or V-like shape in section and so that its end surface is generally parallel to the axial center line of the vibration sensor.

The recess 21 defined by the caulked portion 20 and the peripheral portion 5a therefore has a capacity proportional to the height H2 of the caulked portion 20. The height H2 is larger than H1 of the conventional arrangement, and the capacity of the recess 21 is correspondingly larger. The volume of the potting agent potted in the recess 21 is thereby increased and the sealing effect of the potting agent is correspondingly improved. Thus, the degree of airtightness of the caulked portion is increased with this volume.

Figure 3:
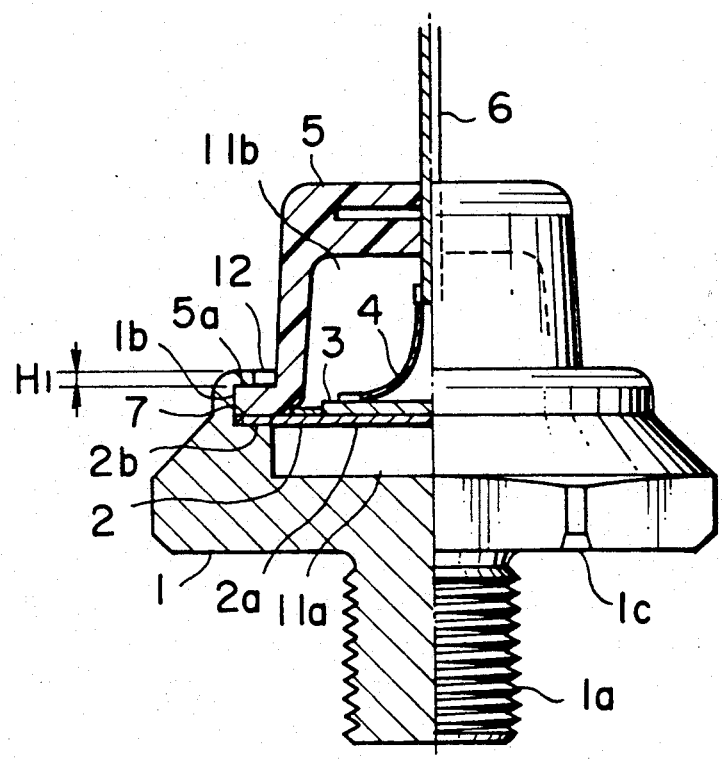
FIG. 3 is a partially sectional view of a conventional vibration sensor.

That is, the airtightness of the vibration sensor is improved with respect to the increase in height from the height H1 of the caulked portion 1b of FIG. 3 to the height H2. The value H2 is greater than that of the thickness of the base case 1 at the caulked portion 20.

The airtightness of the caulked portion 20 is not lowered during several cycles of testing in which the pressure of air in the spaces 11a and 11b is repeatedly changed within a range of about 0.3 atm. The effect of the present invention is sufficient in terms of practice.

Figure 2:
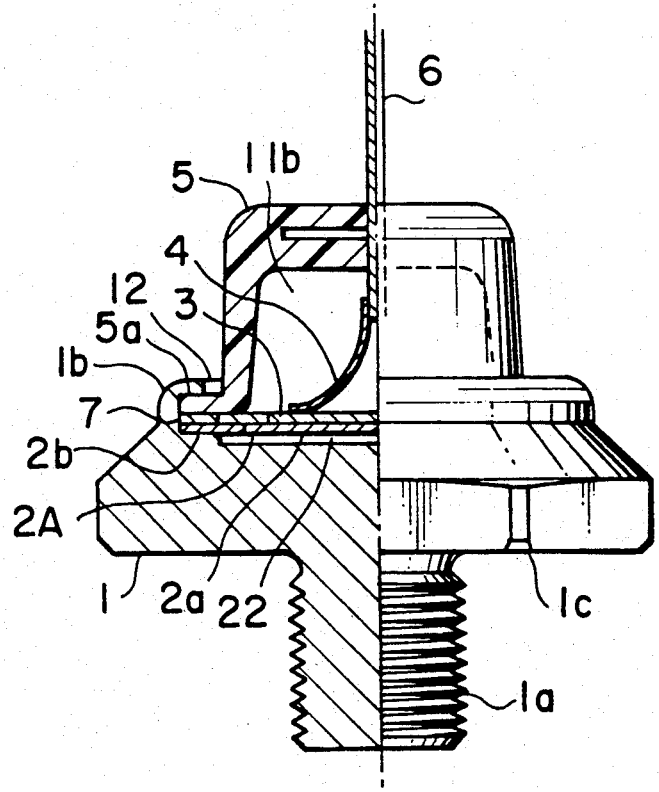
FIG. 2 is a partially sectional view of a vibration sensor in accordance with a second embodiment of the present invention.
Figure 4:
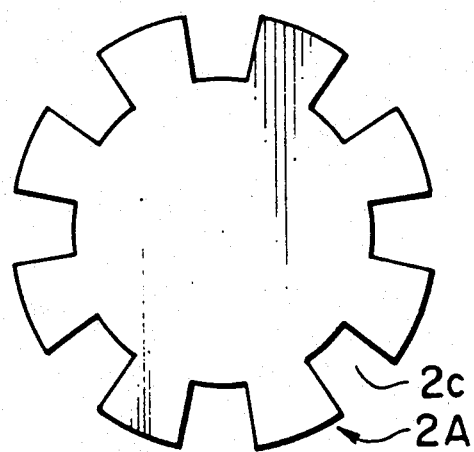
FIG. 4 is a plan view of a vibration plate having cutout portions.

FIG. 2 shows a vibration detector in accordance with a second embodiment of the present invention including a vibration plate 2A having cutouts 2c such as shown in FIG. 4. A space 22 surrounded by the case 1 and the vibration plate 2A is relatively small. That is, its volume ranges from about a few to ten percent of the volume of the space 11b surrounded by the cover 5 and the vibration plate 2A. The depth of the space 22 is approximately equal to the thickness of the vibration plate 2, i.e., about 1 mm.

In this embodiment, the expansion of internal air caused by a thermal shock is substantially equal to the expansion of air contained in the space 11b alone, and the expansion of air in the space 22 is negligibly small. Consequently, the degree of influence of the space 22 upon the airtightness of the portion in which the steel terminal 6 is embedded and upon other portions is negligible.

In the case of a knock sensor for sensing vibrations of a motor vehicle engine, the amplitude of vibration of the vibration plate 2A is on the micron order, and it is possible to make very small the depth to which the metallic case 1 is cut to form the space 22.

Thus, the volume of the space on the side of the vibration plate remote from the terminal side of this plate is set to range from about a few to ten percent of the volume of the space on the terminal side, and the desired airtightness can therefore be maintained when a thermal shock is applied, resulting in improved reliability.

What is claimed is:
1. A vibration sensor comprising:
   a piezoelectric element;
   a vibration plate, one side of which secures and supports said piezoelectric element, said vibration plate having cutouts circumferentially spaced along an outer, peripheral portion;
   a metallic case for holding said vibration plate so that a first space is formed on a side of said vibration plate remote from said one side to which said piezoelectric element is secured and supported; and
   a resin cover for covering said piezoelectric element to form a second space opposite said first space and surrounding said piezoelectric element, a joint portion of said resin cover and said case pinching and fixing said vibration plate in place;
   wherein the volume of said first space ranges from about a few to ten percent of the volume of said second space.

* * * * *